United States Patent [19]

Jördens et al.

[11] Patent Number: 5,143,456
[45] Date of Patent: Sep. 1, 1992

[54] ELASTIC SLIDING BEARING

[75] Inventors: Ernst-Günter Jördens; Helmut Kammel, both of Damme, Fed. Rep. of Germany

[73] Assignee: Lemförder Metallwaren AG, Lemförde, Fed. Rep. of Germany

[21] Appl. No.: 704,317

[22] Filed: May 22, 1991

[30] Foreign Application Priority Data

Nov. 13, 1990 [DE] Fed. Rep. of Germany ....... 4036050

[51] Int. Cl.$^5$ .......................................... F16C 27/02
[52] U.S. Cl. ................................... 384/275; 384/222
[58] Field of Search ............... 384/140, 153, 215, 220, 384/221, 222, 275

[56] References Cited

U.S. PATENT DOCUMENTS

| 3,072,448 | 1/1963 | Melton et al. | 384/280 |
| 3,133,769 | 5/1964 | Drake | 384/145 |
| 3,383,143 | 5/1968 | Schmidt | 384/215 |
| 3,494,676 | 2/1970 | Compton | 384/222 |
| 3,801,209 | 4/1974 | Matsuoka | 384/222 X |
| 3,976,338 | 8/1976 | Trachte et al. | 384/220 |
| 4,878,767 | 11/1989 | Halder | 384/221 X |

FOREIGN PATENT DOCUMENTS

3613123A1 4/1986 Fed. Rep. of Germany.
3804886A1 2/1988 Fed. Rep. of Germany.

*Primary Examiner*—Thomas R. Hannon
*Attorney, Agent, or Firm*—McGlew & Tuttle

[57] ABSTRACT

The elastic sliding bearing for chassis parts in motor vehicles includes of a rigid inner bushing (1) and an outer bushing (2) surrounded by an elastomeric body (3). Both bushings have axial bearing surfaces (5, 6) on radially directed flange projections (4, 7) at an axially outer end, wherein a seal (11) surrounding the axial bearing surfaces (5, 6). The seal acts against the axially outer flange surface with at least one sealing lip (12). A disk (9), which is supported on one side surface by the sliding surface of the flange projection (4) on the inner bushing (1), is loosely inserted between a sliding surface forming the axial bearing surface (5) on the flange projection (4) of the inner bushing (1) and the elastomeric body (3) surrounding the outer bushing (2). In addition, on the surface which is in contact with the disk (9) and forms the axial bearing surface (6), the elastomeric body (3) is provided with recesses (10), so that the axial rigidity of the elastomeric body (3) is reduced in the edge zone that is in contact with the disk (9).

3 Claims, 2 Drawing Sheets

ELASTIC SLIDING BEARING

FIELD OF THE INVENTION

The present invention pertains to an elastic sliding bearing for chassis parts in motor vehicles including a rigid inner bushing and an outer bushing surrounded by an elastomeric body, wherein both of the bushings have, at their axially outer ends, axial bearing surfaces on a radially directed flange projection, wherein a seal is provided surrounding the axial bearing surfaces and acting with at least one sealing lip against the axially outer flange surface.

BACKGROUND OF THE INVENTION

Such a bearing has been known from DE 38,04,886 - C2. It is used mainly for mounting the guard rails and has an outer bushing made of steel-rubber material, whose internal metal sleeve is in direct contact with the sliding surface of the inner bushing, and whose external rubber body (elastomer) can be inserted into a bearing eye of a vehicle part. The flange projection extending on one side at the axial end of the inner bushing is made in one piece with the inner bushing. The radial flange projection at the axial end of the outer bushing is formed by a ring rigidly connected to the outer bushing. These bearings, as such, are designed as one-sided bearings and are mounted in pairs in a mirror-inverted arrangement and are tensioned against each other with an axial clearance, which is actually undesirable, in order to keep the torque low. To reduce the inherently high wear of such sliding bearings, the sealing lip made in one piece with the rubber body in the prior-art design surrounds, on the outside, the profile of the two flange projections of the inner bushing and the outer bushing, which flange projections are in contact with each other, and, on the axially outer side, it touches the inner bushing in a prestressed state. In addition, a coating made from a plastic with good sliding properties is provided between the radially expanding flange projections on the inner bushing and the outer bushing.

German publication DE 36,13,123- C2 discloses a sliding bearing, in which a permanently arranged plastic layer (PTFE layer) with good sliding properties is located on the inner bushing between an inner bushing and an outer bushing, which is surrounded by an elastomeric body (rubber body) connected to it, and this elastomeric body is surrounded by a rigid receiving bushing, and in which lubricant pockets, which are filled with grease for permanent lubrication, are provided on the contact surface with the sliding surface of the outer bushing. Such sliding bearings are sensitive to mechanical effects on the plastic coating, and in the prior-art design they cannot be used to take up axial loads.

SUMMARY AND OBJECTS OF THE INVENTION

It is an object of the present invention to improve the antifriction properties of axially load-bearing sliding bearings of the design described in the introduction and to compensate for an axial clearance without any noticeable increase in torque.

According to the invention, an elastic sliding bearing for chassis parts in motor vehicles is provided comprising a rigid inner bushing with a flange projection defining a sliding surface. An outer bushing is provided surrounding the inner bushing and an elastomeric body is provided surrounding the inner and outer bushing. Each of the bushings are provided with axial bearing surfaces on a radially directed flange projection at their outer ends. A sealing lip associated with the elastomeric body is provided acting against the axially outer flange surface. A disk is provided loosely inserted, positioned between said sliding surface of the flange projection of the inner bushing and the elastomeric body surrounding the outer bushing. The elastomeric body is provided with recesses on a surface that is in contact with the disk to form an axial bearing surface. The arrangement reduces the axial rigidity of the elastomeric body in the edge zone that is in contact with the plastic disk.

In this design, axial forces that may occur are transmitted by a disk from the inner bushing to the outer bushing or vice versa. This disk advantageously consists of a plastic with good sliding properties, if desired, of PTFE (polytetrafluoroethylene), or a coating made form this material on the sliding surface.

The use of the loose disk makes it possible to provide the elastomeric body with recesses on the radial surface that forms the axial bearing surface which is in contact with this plastic disk in order to thus reduce the axial rigidity of the elastomeric body in the edge zone that is in contact with the plastic disk. The sliding bearings of the design according to the present invention, which are arranged in pairs, can be tensioned with each other without any noticeable increase in torque, while the axial clearances are compensated. The cost of manufacturing such sliding bearings of the design according to the present invention does not increase compared with the state of the art.

According to other features of the invention, the disk is formed of a plastic which possesses good sliding properties such that it may be loosely inserted between the axial bearing surface forming the sliding surface on the flange projection of the inner bushing and the axial bearing surface on the elastomeric body. The surface of the plastic disk is provided with friction-increasing profiling on the side facing the axial bearing surface of the elastomeric body. The disk may also be provided with penetrating recesses in the axial direction of the disk.

The drawing shows an embodiment of the present invention based on a bearing to be mounted in pairs.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
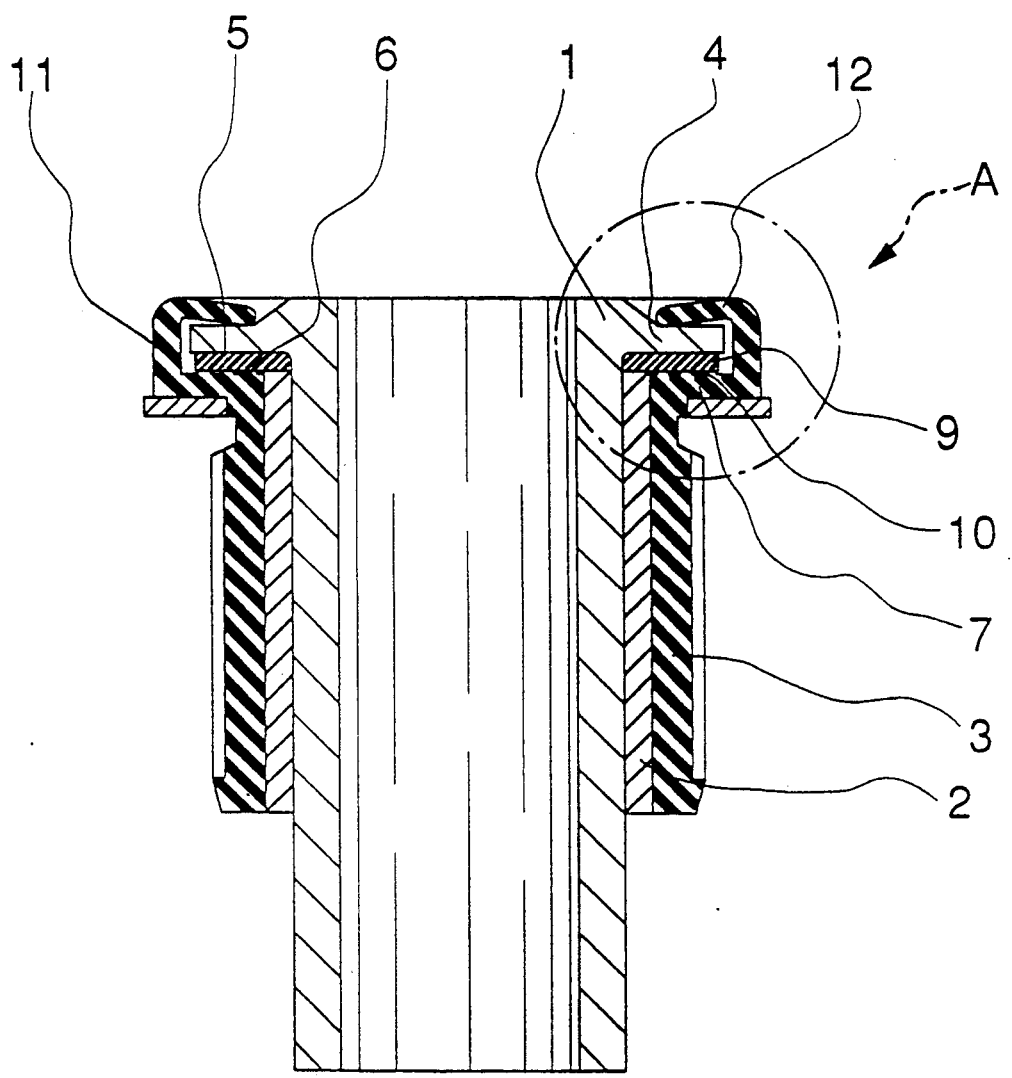
FIG. 1 is a section of a design of the new sliding bearing in an axial plane.
Figure 2:
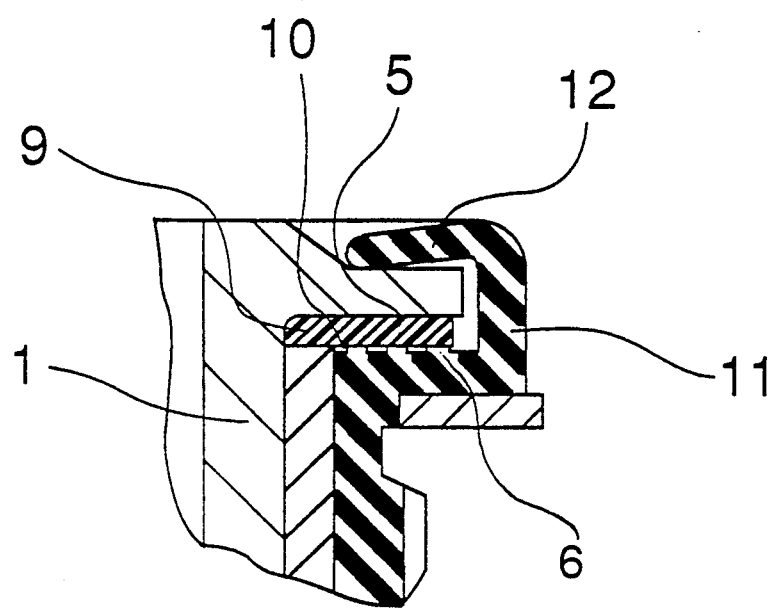
FIG. 2 is an enlarged detail "A" from FIG. 1.

The elastic sliding bearing consists of a rigid inner bushing 1, an essentially likewise rigid outer bushing 2, and an elastomeric body 3 surrounding these. Such a bearing is inserted in pairs in a mirror-inverted arrangement relative to one another in a bearing eye of a guard rail or the like, which is not shown, in order to fasten this guard rail on the longitudinal beams (not shown) of a motor vehicle by means of a bolt passing through the inner bushing 1. FIG. 1 shows the design of one of the two bearings of one pair.

An axially extending flange projection 4, whose axial bearing surface 5 cooperates—to transmit axial forces—with an axial bearing surface 6 on a flange projection 7, and which is made in one piece with the elastomeric body, is provided at an axial end of the inner bushing 1. A loosely inserted disk 9 is arranged between the axial bearing surface 5 on the flange projection 4 and the axial bearing surface 6 on the flange projection 7. The loosely inserted disk 9 advantageously consists of a plastic with good sliding properties. Sliding movement takes place between the contact surface of the disk 9 and the axial bearing surface 5 on the flange projection 4. On the side of the disk 9 opposite this sliding surface, the axial bearing surface 6 of the flange projection 7 is provided with recesses 10, by which the axial rigidity of the elastomeric material of the flange projection 7 is further reduced in the edge zone that is in contact with the disk 10. This elastic edge zone, which is present on both sides at the point of mounting after installation of the bearing, provides for the intended compensation of the axial clearance during the tensioning of the two bearings installed in pairs in the direction of the longitudinal axis of the bolt that passes through the inner bushing 1, but is not shown in the drawing. The contact surface of the disk 9, which is in contact with the flange projection 7, which disk 9 is thus supported by the axial bearing surface of the elastomeric body, advantageously has friction-increasing profiles, so that sliding movements take place exclusively on the contact surface between the axial bearing surface 5 and the surface of the disk 9 facing it. Such a profiling can also be achieved, e.g., by providing a rough surface. Holes passing through the disk 9 in the axial direction are also suitable for achieving the same goal, so that the profiles on the axial bearing surface 6 of the flange projection 7 are pressed into these holes while undergoing elastic deformation and thus increase the surface friction between the two parts. In a known manner, the axial bearing surfaces 5 and 6 sliding on each other are sealed by a collar edge 11 adjoining the flange projection 7. The collar edge 11 surrounds the disk 9 and the flange projection 4 on the outside and abuts, with a sealing lip 12, against the axial end face of the flange projection 4 and is, on the other hand, supported by the longitudinal beam (not shown) or another component of the motor vehicle. To achieve improved antifriction properties of the sliding bearing, and to prolong its service life, the loosely inserted disk 9 may consist of PTFE (polytetrafluoroethylene) or it can be coated with such a material on the contact surface with the axial bearing surface 5.

While a specific embodiment of the invention has been shown and described in detail to illustrate the application of the principles of the invention, it will be understood that the invention may be embodied otherwise without departing from such principles.

What is claimed is:

1. An elastic sliding bearing for chassis parts in motor vehicles, comprising: an inner bushing including an axial bearing surface formed by a flange projection defining a sliding surface; an outer bushing; an elastomeric body surrounding the outer bushing and surrounding said axial bearing surface of said inner bushing and including at least one sealing lip acting against said flange projection; a disk, supported with one side on said sliding surface of said flange projection of said inner bushing, positioned between said sliding surface and said elastomeric body; and, recesses formed in said elastomeric body on a surface in contact with said disk to form an axial bearing surface, thereby reducing axial rigidity of said elastomeric body in an edge zone that is in contact with said plastic disk.

2. A sliding bearing in accordance with claim 1, wherein said disk is made from a plastic possessing good sliding properties, said disk being loosely inserted between said axial bearing surface forming the sliding surface of said flange projection of said inner bushing and said axial bearing surface of said elastomeric body.

3. A sliding bearing in accordance with claim 1, wherein said surface of said plastic disk includes a friction-increasing profiling on a side facing said elastomeric body.

* * * * *